April 14, 1964 C. L. SMALL 3,129,016
TANDEM AXLE SUSPENSION
Filed Jan. 3, 1962 2 Sheets-Sheet 2
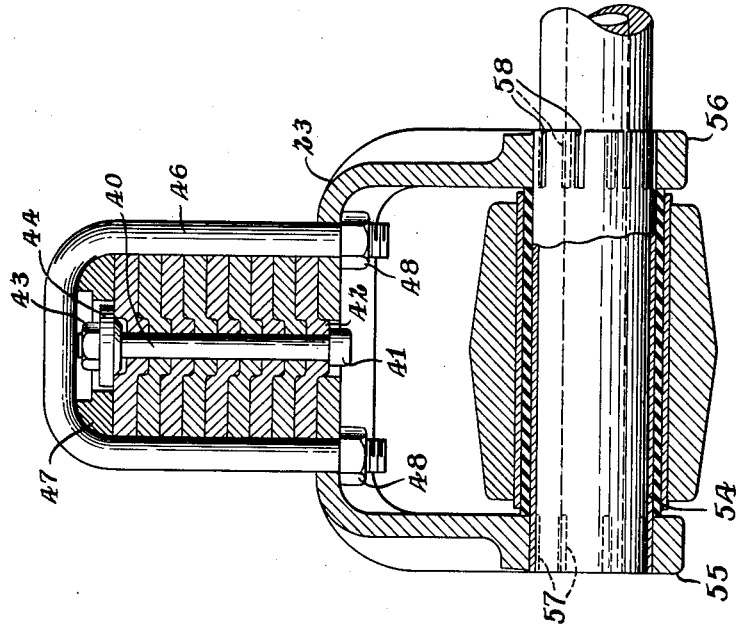
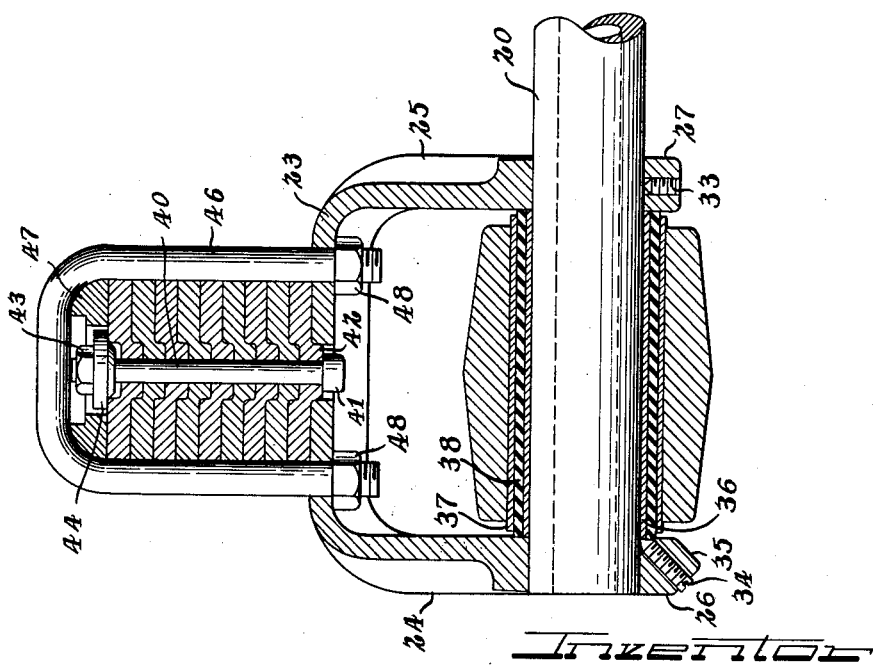
INVENTOR
CHARLES L. SMALL
BY Cromwell, Greist & Warden
ATTYS.

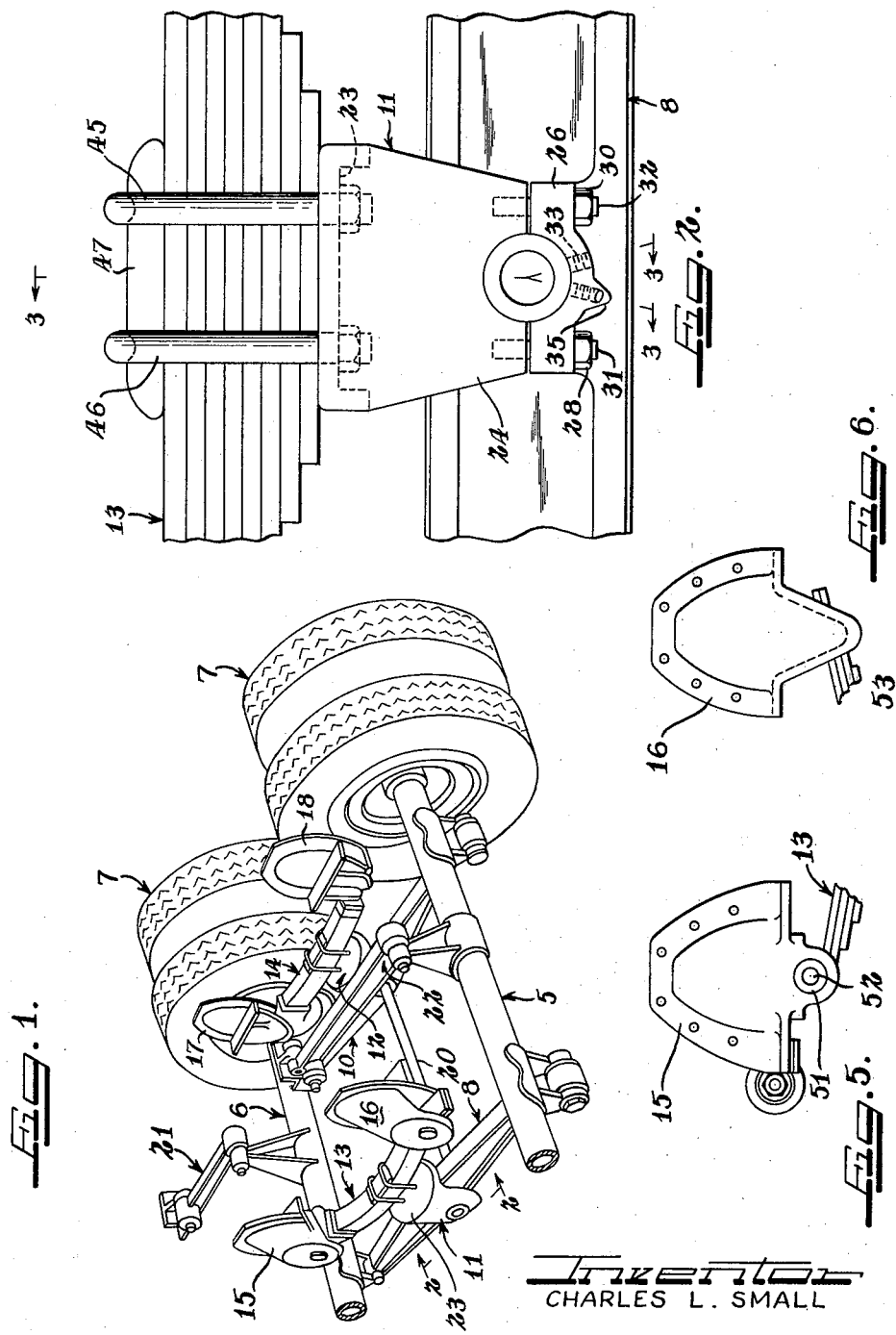

United States Patent Office 3,129,016
Patented Apr. 14, 1964

3,129,016
TANDEM AXLE SUSPENSION
Charles L. Small, Chicago, Ill., assignor to Hendrickson Manufacturing Company, Lyons, Ill., a corporation of Illinois
Filed Jan. 3, 1962, Ser. No. 164,078
3 Claims. (Cl. 280—104.5)

This invention relates generally to innovations and improvements in tandem axle suspensions for all wheeled type vehicles such as heavy duty trucks, semi-trailers, including low-bed semi-trailers, and other wheeled type vehicles using tandem axle suspensions. More particularly, the invention is directed to certain innovations and improvements which permit use of lighter weight parts and eliminate machining operations with a resulting reduction in cost.

A tandem axle suspension of the general type with which the present invention is concerned is shown, for example, in FIG. 1 of Miller Patent 2,983,555, dated May 19, 1961.

Tandem axle suspensions of the type to which this invention relates are in wide commercial use on heavy duty trucks and semi-trailers. These suspensions generally include the following assemblies and sub-assemblies: (1) fore and aft axle assemblies with dual ground wheels mounted on the outer ends thereof; (2) a pair of equalizer beam assemblies interconnecting the front and rear ends of the axle assemblies on opposite sides of the suspensions; (3) saddle assemblies pivotally mounted on the equalizer beams midway between the opposite ends thereof; (4) leaf spring assemblies mounted on the saddle assemblies and securely attached thereto; (5) a pair or set of spring hangers for each side of the suspension for the purpose of connecting the front and rear ends of each spring assembly in load-supporting relationship to the vehicle frame; and (6) a beam center cross tube interconnecting the saddle assemblies. Heretofore, the opposite ends of the cross tubes have not been firmly or rigidly clamped to the saddle assemblies. On the contrary, they have purposely had very loose and sloppy fits so that each of the saddle assemblies could pivot on its end of a cross tube independent of the saddle assembly on the opposite side.

In such prior arrangements the sole purpose and function of the cross tubes was to lend stability to the tandem axle suspensions only when they were subjected to unusual or extreme conditions such as when a vehicle turned very sharp.

The object of the invention, generally stated, is the provision of tandem axle suspensions for all wheeled type vehicles wherein modifications are made so as to effect reductions in both weight and cost without sacrificing strength or performance characteristics of the suspension.

An alternate object of the invention is the provision of tandem axle suspensions for all wheeled type vehicles which have improved rigidity and performance characteristics without appreciable increase in the cost thereof.

A more specific object of the invention is the provision of tandem axle suspensions of the class described wherein the beam center cross tubes are at all times securely anchored or clamped at opposite ends, either directly or indirectly, to the saddle assemblies so as to prevent the saddles from pivoting independently of each other, thereby either: (1) simplifying the attachment of the leaf spring assemblies to the saddle assemblies so as to effect both reductions in weight and cost without reduction in the strength or capacity of the suspensions; or, (2) increasing the strength, rigidity and performance of given suspensions without materially increasing the cost thereof.

Certain other objects of the invention will, in part, be obvious and will in part appear hereinafter.

For a more complete understanding of the nature and scope of the invention reference may now be had to the following detailed description thereof taken in connection with the accompanying drawings wherein:

FIG. 1 is a perspective view, certain parts being omitted or removed, of a tandem axle suspension of the general type to which the present invention pertains and in connection with which it can be described;

FIG. 2 is an enlarged, fragmentary elevational view from the outside taken generally on line 2—2 of FIG. 1 and showing the mounting of the saddle assembly on the equilizer beam as well as the mounting of the leaf spring assembly on the saddle assembly;

FIG. 3 is a view partly in section taken on line 3—3 of FIG. 2;

FIG. 4 is a view similar to FIG. 3 showing a modification;

FIG. 5 is a fragmentary side elevational view of a front hanger or spring support; and FIG. 6 is a fragmentary side elevational view of a rear hanger or spring support.

Referring to FIG. 1, the tandem axle suspension shown therein is suitable for use on a heavy duty low-bed semi-trailer or other wheeled type vehicles wherein the wheels are not driven. It will be understood that similar tandem axle suspensions wherein the axles are provided with differentials and propeller shafts, are useful for heavy duty trucks and tractor trucks.

The tandem axle suspension shown in FIG. 1 comprises several assemblies or sub-assemblies including: fore and aft axle assemblies 5 and 6 having sets of dual wheels 7—7 mounted on opposite ends thereof; a pair of equalizer beam assemblies indicated generally at 8 and 10 interconnecting the axle assemblies adjacent the corresponding ends thereof just inwardly of the wheel units 7; saddle assemblies 11 and 12 pivotally mounted on the equalizer beams midway between the ends thereof; leaf spring assemblies 13 and 14 mounted on the saddle assemblies 11 and 12, respectively; a pair of forward and rear spring hangers 15 and 16, respectively, for the spring assembly 13 and another pair 17 and 18 for the other spring assembly 14; a beam center cross tube 20; and, forward and rear torque rod assemblies 21 and 22, respectively, mounted on the axles. The torque rods prevent the axles from rotating due to driving and braking forces.

Referring to FIGS. 2 and 3, the saddle 11 has a flat platform portion 23 at the top from which the integral side legs 24 and 25 (FIG. 3) depend with the bottom ends thereof being provided in the centers with inverted semi-circular recesses for accurately fitting over the upper half of the cross tube 20 on opposite ends thereof. Each of the legs 24 and 25 is provided with a mating bottom clamp member 26 and 27, respectively, having a semi-circular recess in their upper faces for fitting the lower half of the cross tube 20, as shown. Referring to FIG. 2, the clamp 26 is shown drawn up to the bottom of the saddle leg 24 by a pair of nuts 28 and 30 which fit over studs 31 and 32 carried on the bottom of the saddle leg 24 and projecting through smooth apertures provided therefor and the clamp member 26. It will be understood that the clamp member 27 is drawn up on the underside of the saddle leg 25 in like manner.

In order to lock or anchor the cross tube 20 to the saddle assembly 11 and also interlock the saddle assembly with the equalizer beam 8, set screws 33 and 34 are provided. The set screw 33 passes upwardly through the inner clamp member 27 and penetrates the surface of the cross tube 20 as indicated, thereby interlocking the cross tube and the saddle assembly. The set screw 34 passes through a threaded hole provided therefor in a boss 35 so as to engage both the cross tube 20 and the end of a sleeve bushing 36 which fits over the cross tube 20 in between the inner faces of the saddle legs 24 and 25. The sleeve 36 constitutes the inner portion of a bushing for the equalizer beam 8, which bushing has an outer metallic sleeve 37 and an intermediate sleeve 38 of rubber or rubber-like material. The rubber sleeve 38 is bonded to the adjacent surfaces of the inner and outer metal sleeves 36 and 37.

The multi-leaf spring 13 is mounted on the top of the saddle platform 23, the spring leaves being secured together by means of a bolt 40 (FIG. 3) extending vertically therethrough. The bolt 40 has a head 41 at the bottom which fits against the underside of the cup portion 42 of the bottom leaf. The cup 42 seats in an opening provided therefor in the platform 23. Each of the leaves is similarly cupped and the cup portions of all leaves are nested as shown in FIG. 3. The leaves are held together by tightening a nut 43 on the upper end of the bolt 40 against a washer 44 having a bottom boss by which it is centered in the cup recess of the upper leaf.

The spring assembly 13 is secured to the saddle 11 by means of a pair of U-bolts 45 and 46 which fit over a pad member 47 resting on the top spring leaf. The legs of the bolts 45 and 46 extend down along opposite sides of the spring leaves and project through openings provided therefor in the saddle platform 23. Torque nuts 48—48 are tightened on the threaded ends of each of the U-bolts 45 and 46 so as to draw the assembly tightly together and secure the same in position on the platform 23. The forward end of spring 13 is provided in known manner with an eye 51 (FIG. 5) which fits over a pin 52 carried by the forward bracket or hanger 15 as shown in FIG. 5. At the rear the spring 13 rest in known manner on the top of the inwardly projecting support 53 formed on the bottom of the rear bracket 16, as shown in FIG. 6.

In FIG. 4 a somewhat modified arrangement is shown in that the set screws 33 and 34 are omitted and the bushing for the equalizer beam has an elongated inner sleeve 54 which is long enough so that the opposite ends project through to the outer faces of the saddle legs 24 and 25. The outer and inner bottom clamp members 55 and 56 are drawn up tightly so as to firmly clamp the projecting ends of the sleeve 54 and the cross tube 20 together whereby rotation between the cross tube and the saddle 11 is prevented. Preferably the opposite ends of each sleeve 54 are provided with longitudinally directed slots 57—57 and 58—58 so as to enhance the clamping effect.

It will be seen that similar constructions are provided on opposite sides of the tandem unit with the result that the opposite ends of the beam center cross tube 20 are firmly anchored to the saddle assemblies 11 and 12 on opposite sides of the axle unit. As a result of this anchoring action, which is believed to be new in tandem axle suspensions with this type of spring and saddle arrangement, any tendency of one saddle and its spring assembly to pivot independently due to the forces imposed on the suspension when the vehicle turns a corner is effectively resisted through the cross tube by the opposite saddle and spring assembly. Each saddle and spring combination on each side of the suspension, being locked together as described, directs the forces in the opposite saddle and spring assembly as a fore and aft force into the spring pin 52 and on into the main supporting frame of the vehicle through the spring hanger 15. As a result, a stronger and more rigid tandem axle suspension is provided which may be taken advantage of. In the construction shown in the drawings, the saddle assemblies 11 do not have the usual upstanding heavy chair back members projecting upwardly on the inside of the leaf spring assemblies. Furthermore, the pad assemblies at the top are simple and lightweight. Conventionally, it has been the practice to have saddle members which have the heavy inside chair back members and heavy pad members fitting on the top of the springs, all securely bolted together. By reason of the anchoring of the opposite ends of the cross tube 20 as shown it is possible to dispense with the heavy chair backs and the heavy pads and to considerably lighten the weight of the spring and saddle combinations while at the same time substantially reducing the cost thereof through the elimination of the need to machine the chair parts and the rather complicated top pad members.

In actual test suspensions embodying the invention it has been found possible to reduce the weight by 190 pounds, which represents a 20% weight reduction in the areas affected.

Sidewise and twisting forces encountered in the conventional suspensions with non-anchored beam center cross tubes are eliminated since in the improved suspensions described the forces are re-directed in a fore and aft direction through the spring eyes.

It will be appreciated that the specific embodiments described in detail above in connection with the accompanying drawings are illustrative and not intended to be considered in a limiting sense.

What is claimed as new is:

1. In a tandem axle suspension for wheeled vehicles including fore and aft axle assemblies with ground wheels on opposite ends thereof, a pair of equalizer beam assemblies interconnecting the ends of said axle assemblies on opposite sides of said suspension, saddle assemblies pivotally mounted on the equalizer beams midway between the ends thereof, leaf spring assemblies mounted on said saddle assemblies, and a pair of spring hangers for each side of said suspension for connecting the front and rear ends of each spring assembly in load bearing relationship to a vehicle frame, the improvement which comprises a beam center cross tube interconnecting said saddle assemblies with the opposite ends of said tube firmly clamped to said assemblies so as not to allow either saddle assembly to pivot independently of the other, and said leaf spring assemblies being mounted on said saddle assemblies by simplified and light-weight fastening means.

2. In a tandem axle suspension for wheeled vehicles including fore and aft axle assemblies with ground wheels on opposite ends thereof, a pair of equalizer beam assemblies interconnecting the ends of said axle assemblies on opposite sides of said suspension, saddle assemblies pivotally mounted on the equalizer beams midway between the ends thereof, leaf spring assemblies having nested center cup portions in the leaves mounted on said saddle assemblies, a pair of spring hangers for each side of said suspension for connecting the front and rear ends of each spring assembly in load bearing relationship to a vehicle frame, and a beam center cross tube extending between said saddle assemblies, the improvement which comprises having the opposite ends of said cross tube inter-clamped with respect to said saddle assemblies and said leaf spring assemblies being secured in place on said saddle assemblies only by means of U-bolts.

3. In a tandem axle suspension for wheeled vehicles including fore and aft axle assemblies with ground wheels on opposite ends thereof, a pair of equalizer beam assemblies interconnecting the ends of said axle assemblies on opposite sides of said suspension, each of which equalizer beams has a center eye midway between the ends thereof, saddle assemblies pivotally mounted on the equalizer beams midway between the ends thereof, leaf spring assemblies having nested center cup portions in the leaves mounted on said saddle assemblies, a pair of spring hangers for each side of said suspension for connecting the front and rear ends of each spring assembly in load bearing relationship to a vehicle frame, and a beam center cross tube extending between said saddle assemblies, the improvement which comprises having said leaf spring assemblies secured in place on said saddle assemblies only by means of U-bolts, and having the opposite ends of said cross tube inter-clamped with respect to said saddle assemblies by means of bushings each having an inner metal sleeve having a close interfit on the adjacent end of said cross tube with the opposite ends of said inner sleeve being slotted and clamped tightly in the opposite legs of the associated saddle, each of said bushings having an outer metal sleeve seated within the center eye of the associated equalizer beam with a sleeve of rubber interposed between said bushing sleeves.

References Cited in the file of this patent

UNITED STATES PATENTS

| | | |
|---|---|---|
| 1,316,017 | Clemens | Sept. 16, 1919 |
| 2,071,480 | Williams | Feb. 23, 1937 |
| 2,760,784 | Talbert | Aug. 28, 1956 |
| 2,810,587 | Boughner | Oct. 22, 1957 |
| 2,983,555 | Miller | May 9, 1961 |